US010364913B2

(12) United States Patent
Nomerange

(10) Patent No.: US 10,364,913 B2
(45) Date of Patent: Jul. 30, 2019

(54) FLOW-CONTROL DEVICE WITH REDUCED WEIGHT

(71) Applicant: SAFRAN AIRCRAFT ENGINES, Paris (FR)

(72) Inventor: Philippe Nomerange, Poissy (FR)

(73) Assignee: SAFRAN AIRCRAFT ENGINES, Paris (FR)

( * ) Notice: Subject to any disclaimer, the term of this patent is extended or adjusted under 35 U.S.C. 154(b) by 0 days.

(21) Appl. No.: 15/312,380

(22) PCT Filed: May 20, 2015

(86) PCT No.: PCT/FR2015/051326
§ 371 (c)(1),
(2) Date: Nov. 18, 2016

(87) PCT Pub. No.: WO2015/177467
PCT Pub. Date: Nov. 26, 2015

(65) Prior Publication Data

US 2017/0089486 A1 Mar. 30, 2017

(30) Foreign Application Priority Data

May 21, 2014 (FR) ..................................... 14 54561

(51) Int. Cl.
*F16K 31/42* (2006.01)
*F02K 9/58* (2006.01)
(Continued)

(52) U.S. Cl.
CPC ................ *F16K 31/42* (2013.01); *F02K 9/58* (2013.01); *F16K 31/126* (2013.01); *F05D 2220/80* (2013.01); *F16K 99/0055* (2013.01)

(58) Field of Classification Search
CPC ........ F16K 31/126; F16K 31/42; F16K 31/12; F16K 99/0055; F02K 9/58; F05D 2220/80
(Continued)

(56) References Cited

U.S. PATENT DOCUMENTS 4,355,663 A 10/1982 Burkes, Jr. et al.
4,716,927 A * 1/1988 Vayra .................... F16K 17/105 137/490

(Continued)

FOREIGN PATENT DOCUMENTS

GB 2 071 285 A 9/1981

OTHER PUBLICATIONS

International Search Report dated Sep. 10, 2015 in PCT/FR2015/051326 filed May 20, 2015.

*Primary Examiner* — Marina A Tietjen
*Assistant Examiner* — Paul J Gray
(74) *Attorney, Agent, or Firm* — Oblon, McClelland, Maier & Neustadt, L.L.P.

(57) ABSTRACT

A device for regulating flow rate of a gas in a duct, the device including a valve member having an actuator, the valve member being configured in such a manner as to shut off the duct selectively, wherein movement of the valve member is controlled by the resultant firstly of pressure in the duct upstream from the valve member acting on a proximal surface of the valve member, and secondly of a control pressure applied to a distal surface of the valve member of area greater than that of the proximal surface of the valve member, the control pressure being established in an amplification chamber having a feed line and an emptying line, one of the feed and emptying lines presenting a flow rate that is constant and the other presenting a flow rate that is variable and that is controlled by an actuator.

4 Claims, 1 Drawing Sheet

(51) Int. Cl.
*F16K 31/126* (2006.01)
*F16K 99/00* (2006.01)

(58) Field of Classification Search
USPC ..... 137/495, 498, 500; 60/233, 242; 251/25, 251/28, 30.01, 41, 61, 61.2
See application file for complete search history.

(56) References Cited

U.S. PATENT DOCUMENTS

| | | | | |
|---|---|---|---|---|
| 4,777,794 | A | 10/1988 | Nielsen | |
| 6,233,919 | B1 | 5/2001 | Abel et al. | |
| 6,386,509 | B1 * | 5/2002 | Mastuzawa | G05D 16/0672 251/61.2 |
| 7,650,903 | B2 * | 1/2010 | Yamamoto | F16K 31/126 137/487.5 |
| 8,443,830 | B2 * | 5/2013 | Tanikawa | F16K 41/10 137/341 |
| 2010/0307618 | A1 * | 12/2010 | Zeng | F16K 31/385 137/565.13 |
| 2011/0284779 | A1 * | 11/2011 | Cewers | F16K 31/007 251/118 |
| 2012/0186224 | A1 * | 7/2012 | Huber | B64D 33/06 60/242 |
| 2014/0138564 | A1 * | 5/2014 | Adams | F15B 15/10 251/63.6 |

* cited by examiner

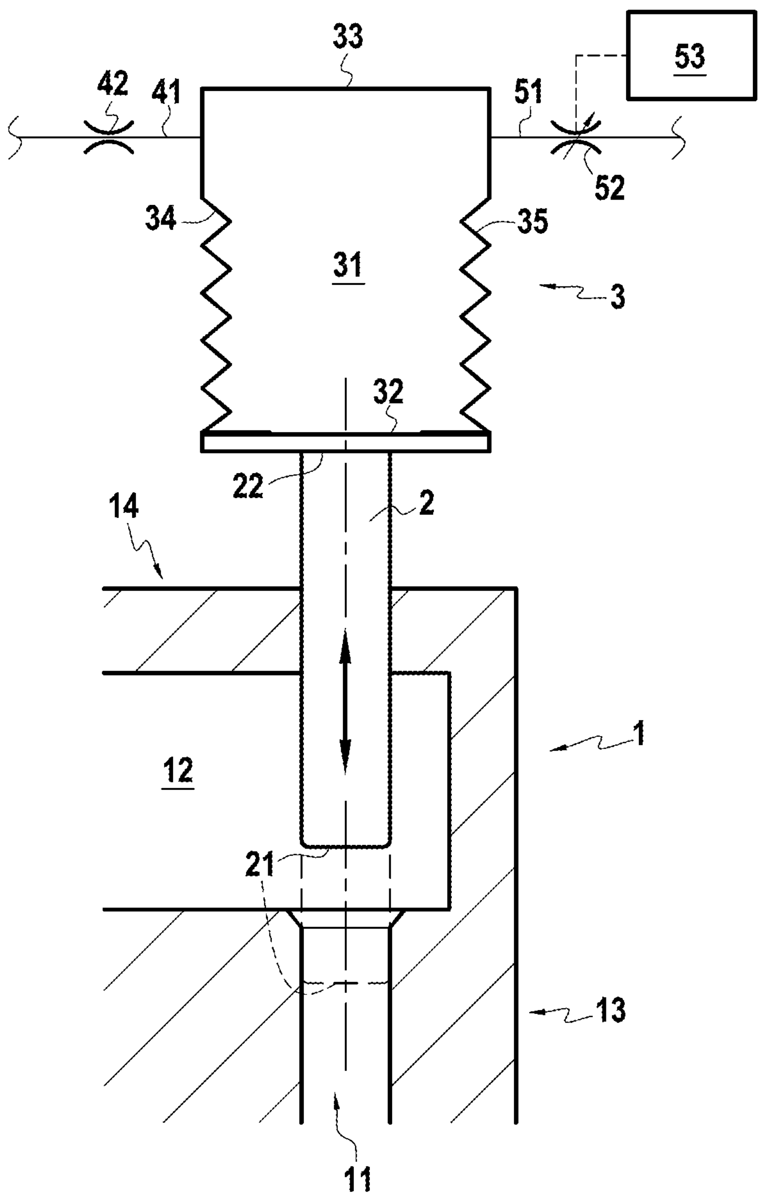
33
42
41
51
53
52
34
35
31
3
32
22
2
14
1
12
21
13
11

FLOW-CONTROL DEVICE WITH REDUCED WEIGHT

GENERAL TECHNICAL FIELD

The present invention relates to the field of equipment for regulating gas flow rate, and it finds a particular application in low-thrust rocket engines.

STATE OF THE PRIOR ART

Low-thrust cryogenic rocket engines present several problems associated in particular with constraints on dimensioning components, in particular relating to elements for regulating flow rate as used in such engines.

Specifically, most of the subsystems of an engine present a scale and thus a weight that depends for the most part on the mass flow rate of the fluid passing through the engine. Such a subsystem thus presents relative weight that decreases with increasing maximum thrust of the engine.

In contrast, other subsystems, such as equipment for regulating gas flow rate, are of weight that also depends to a great extent on other parameters such as interfaces, functional requirements, and constraints in terms of the technology used.

More precisely, for electrically-controlled gas flow rate regulator equipment, of the kind commonly in use, several components are needed in order to be able to perform the function of regulating flow rate:

- an electric motor of dimensions that are minimized by using an element for reducing the speed and amplifying the forces that are generated, there nevertheless existing a limit size below which is not possible to go, and a practical limit beyond which the loss of efficiency can no longer be compensated by increasing force from the motor;
- an element for reducing speed and for amplifying the generated forces, of volume and of weight that depend mainly on the technology used; for example an epicyclic gear train, a planetary gear train, or a system having deformable parts; and
- auxiliary components such as sensors, sealing elements, connectors, of size that is independent of the flow rate passing through the flow rate regulator equipment.

Document U.S. Pat. No. 6,233,919 presents an example of a flow rate regulator valve for a rocket engine that is controlled by regulating pressures applied to opposite surfaces of a valve member. Nevertheless, the structure proposed in that document is not satisfactory in terms of size, and it is also problematic in terms of implementation because of the multitude of ducts provided in the body of the valve.

Miniaturizing gas flow rate regulator equipment is thus problematic, in that present equipment does not enable scale and weight to be reduced in satisfactory manner with a reduction in the fluid flow rate passing therethrough.

SUMMARY OF THE INVENTION

In order to respond at least in part to these various problems, the present invention proposes a device for regulating flow rate of a gas in a duct, the device comprising a valve member having an actuator, the valve member being configured in such a manner as to shut off the duct selectively, the device being characterized in that movement of the valve member is controlled by the resultant firstly of pressure in the duct upstream from the valve member acting on a proximal surface of the valve member, and secondly of a control pressure applied to a distal surface of the valve member of area greater than that of the proximal surface of the valve member, said control pressure being established in an amplification chamber having a feed line and an emptying line, one of said feed and emptying lines presenting a flow rate that is constant and the other presenting a flow rate that is variable and that is controlled by control means.

In a particular embodiment, the amplification chamber is formed by a bellows having one end connected to the proximal surface of the valve member and another end that is stationary.

The duct typically has an upstream portion and a downstream portion that are not in alignment, the valve member being in alignment with and slidably mounted in the upstream portion in such a manner that the proximal surface of the valve member corresponds to the inside section of the upstream portion of the duct.

In a particular embodiment, the control means are selected from the following actuators: a piezoelectric ceramic actuator; a piezoelectric type actuator with mechanical amplification; a magnetostrictive effect actuator; and an actuator using magnetic shape memory alloys, of deformation controlled by an external electric or magnetic field that is applied thereto.

In a particular embodiment, the amplification chamber is fed with gas bled off from the duct upstream from the valve member.

BRIEF DESCRIPTION OF THE FIGURES

Other characteristics, objects, and advantages of the invention appear from the following description which is purely illustrative and non-limiting, and which should be read with reference to accompanying FIG. 1, which is a diagram showing a regulator device in an aspect of the invention.

DETAILED DESCRIPTION

FIG. 1 is a diagram of a regulator device in an aspect of the invention. This FIGURE shows a duct 1 for passing a flow of gas, e.g. a cryogenic gas.

FIG. 1 shows a portion of the duct 1, reference 11 identifies the admission for gas into this portion, and reference 12 identifies the discharge of gas from this portion. The gas thus flows from the admission 11 to the discharge 12.

A valve member 2 is positioned in the duct 1, so as to act selectively to shut off or to allow a variable amount of gas to pass from the admission 11 to the discharge 12.

The relationship for flow rate variation (or for open flow section) as a function of the position of the valve member 2 can be adapted by introducing a fixed sleeve around the valve member 2, which sleeve is pierced by a hole of shape that is adapted to the desired relationship, and that is progressively uncovered by the movement of the valve member 2.

The valve member 2 is controlled by control means 3. In the embodiment shown, the valve member 2 is mounted to slide in translation between a closed abutment position in which it completely shuts off the duct 1, and an open abutment position in which the flow rate in the duct 1 is at its maximum value.

The control means 3 move the valve member 2 in proportion to pressure.

The pressure control of the valve member 2 is the result of pressures applied to two opposite surfaces of the valve member: a proximal surface 21 of the valve member 2 and a distal surface 22 of the valve member 2.

The proximal surface 21 of the valve member 2 is the surface of the valve member that is subjected to the pressure exerted by the gas upstream from the valve member 2. When the valve member 2 shuts off the duct 1, it is the pressure in the admission 11, ignoring any head losses. The distal surface 22 of the valve member 2 is the surface of the valve member 2 that is remote from the proximal surface 21.

The control 3 comprises an amplification chamber 31 of variable volume having one of its walls formed by the distal surface of the valve member 2. The volume of the amplification chamber 31 is thus proportional to the travel of the valve member 2.

In the embodiment shown, the duct 1 is in the form of a bend; it thus has an upstream portion 13 and a downstream portion 14 that are substantially perpendicular. In this example, the valve member 2 is mounted to slide along the axis of the upstream section 13 and is of section identical to the inside section of the upstream portion 13, such that the valve member 2 closes the upstream portion when it is inserted in the upstream portion 13. The pressure acting on the distal surface 22 of the valve member 2 tends to push it out from the upstream portion 13 by causing it to slide, thereby allowing gas to flow in the duct 1.

As shown, the amplification chamber 31 is defined by a stationary end wall 33, a movable proximal portion 32 secured to the distal surface 22 of the valve member 2, and movable side walls 34 and 35 that enable the proximal surface 32 to move relative to the end wall 33 so as to modify the volume of the amplification chamber 31.

In the embodiment shown, the side walls 34 and 35 have a concertina-type structure, e.g. a bellows serving to isolate the amplification chamber 31 from the surrounding medium, thereby enabling the volume of the amplification chamber 31 to vary. This structure may also have its own mechanical stiffness as a function of how far it is extended relative to its equilibrium length, thereby contributing to the balance of forces on the valve member 2 and enabling positioning at each point along the stroke of the valve member 2 that ensures a different pressure inside the cavity defined by its structure.

The amplification chamber 31 is connected to a feed line 41 and to a discharge line 51, serving respectively to feed gas into the amplification chamber 31 and to exhaust it therefrom. The gas in the amplification chamber 31 may be the same as the gas flowing in the duct 1, or it may be a different gas, or indeed it may be a liquid. When the gas in the amplification chamber 31 is the same as the gas flowing in the duct 1, the feed line 41 and the discharge line 51 are typically connected to the duct 1 so as to bleed off gas upstream from the valve member 2.

The feed line 41 includes a feed regulator 42 for regulating the flow rate of gas entering into the amplification chamber 31, and the discharge line 51 includes a discharge regulator 52 regulating the flow rate of gas leaving the amplification chamber 31.

Only one of the feed regulator 42 and the discharge regulator 52 delivers a flow rate that is constant, while the other one is a regulator capable of delivering a flow rate that is variable under the control of control means.

The flow rate is typically varied by varying the flow section through the feed regulator 42 or the discharge regulator 52.

In the embodiment shown in FIG. 1, the discharge regulator 52 is a regulator that delivers a variable flow rate, specifically it is a variable flow rate reducer controlled by control means 43, while the feed regulator 42 delivers a constant flow rate; in this example it is a constriction. The description below relates to this configuration as shown in FIG. 1. The opposite configuration is also possible, in which the feed regulator 42 delivers a variable rate and is controlled by control means, while the discharge regulator 52 is a constant rate regulator.

Consequently, the pressure within the amplification chamber 31 is controlled directly by the control means 53 controlling the discharge regulator 52. This single control means 53 thus serves to control the pressure within the amplification chamber 31 and thus to control the movement of the valve member 2.

As mentioned above, the pressure control of the valve member 2 is the result of pressures applied to two opposite surfaces of the valve member; a proximal surface 21 of the valve member 2 and a distal surface 22 of the valve member 2. The distal surface 22 of the valve member is fastened to the proximal portion 32 of the amplification chamber 31, with the proximal portion 32 of the amplification chamber 31 being configured to have an area that is greater than the area of the proximal surface 21 of the valve member 2. Thus, by applying identical pressures to the proximal surface 21 of the valve member 2 and to the proximal portion 32 of the amplification chamber 31, the larger area of the proximal portion 32 of the amplification chamber 31 delivers a resultant force that is greater than the force resulting from the pressure applied to the proximal surface 21 of the valve member 2.

The amplification chamber 31 thus amplifies the pressure control for controlling the piston 2; the pressure required for controlling the piston 2 is thus reduced.

The movement of the piston 2 and thus the control of the flow rate in the duct 1 can thus be achieved using single control means 53 of dimensions that can be small because of the amplification function of the amplification chamber 31.

The valve member 2 is positioned by balancing the forces acting on the valve member 2, these forces resulting both from the pressures upstream from the valve member 2 and the pressure in the amplification chamber 31, as described above, and also from the mechanical stiffness, if any, of the walls 34 and 35 of the structure isolating the amplification chamber 31.

By its nature, the control 53 is also not exposed to the gas flowing in the duct 1, thereby making it possible in particular to be unaffected, at least to some extent, by the constraints associated with the flow of a cryogenic gas in the duct 1.

By way of example, the control 53 is a piezoelectric ceramic actuator, a piezoelectric type actuator with mechanical amplification, a magnetostrictive effect actuator, or an actuator making use of magnetic shape memory alloys, that can be deformed under the control of an external magnetic field applied thereto.

Without the amplification chamber 31, such actuators could not be used directly to control the movement of the valve member 2 since the movement they would make possible and the force they can develop would not be sufficient.

The fluid flowing in the duct 1 is typically a gas or a two-phase fluid that includes a gas, e.g. a cryogenic propellant.

The device described thus enables a significant saving in weight and size to be achieved, in particular when designing low-thrust cryogenic engines. Specifically, the proposed device makes it possible to decorrelate the dimensioning of the actuator device 53 relative to the flow rate of gas passing through the duct 1, thereby making it possible to achieve a large saving of weight when the gas flow rate is small.

Furthermore, the proposed structure does not require the use of transmission or of movement transformation mechanisms, and it is thus advantageous in terms of design. Furthermore, the proposed control by balancing pressures makes it possible to obtain a device that is fast.

The invention claimed is:

1. A device for regulating flow rate of a gas in a duct, the device comprising:

a valve member having an actuator, the valve member being configured in such a manner as to shut off the duct selectively, the valve member including a proximal surface subjected to pressure exerted by the gas in the duct upstream from the valve member, and a distal surface which is remote from the proximal surface, wherein movement of the valve member is controlled by pressure in the duct upstream from the valve member acting on the proximal surface of the valve member, and a control pressure applied to the distal surface of the valve member of area greater than that of the proximal surface of the valve member, said control pressure being established in an amplification chamber having a feed line which supplies a fluid into the amplification chamber and an emptying line through which the fluid supplied to the amplification chamber exits, one of said feed and emptying lines presenting a flow rate that is constant and the other of said feed and emptying lines presenting a flow rate that is variable and that is controlled by only a single control actuator, the single control actuator being free from exposure to gas flowing in the duct, wherein the amplification chamber includes a first movable end wall secured to the proximal surface of the valve member, a second stationary end wall, and movable side walls which enable the first movable end wall to move relative to the second stationary end wall so as to modify a volume of the amplification chamber, the amplification chamber being isolated from a surrounding medium including the gas in the duct such that the first movable end wall and the movable side walls of the amplification chamber are not in contact with the gas in the duct, wherein the gas is a cryogenic gas, and wherein the feed line presents a flow rate that is constant and the emptying line presents a flow rate that is variable and that is controlled by the single control actuator.

2. A device according to claim 1, wherein the amplification chamber is formed by a bellows having one end connected to the proximal surface of the valve member and another end that is stationary.

3. A device according to claim 1, wherein said duct has an upstream portion and a downstream portion that are not in alignment, the valve member being in alignment with and slidably mounted in the upstream portion in such a manner that the proximal surface of the valve member corresponds to the inside section of the upstream portion of the duct.

4. A device according to claim 1, wherein the actuator is selected from the following actuators: a piezoelectric ceramic actuator; a piezoelectric type actuator with mechanical amplification; a magnetostrictive effect actuator; and an actuator using magnetic shape memory alloys, of deformation controlled by an external electric or magnetic field that is applied thereto.

* * * * *